June 28, 1932. H. E. FATLAND 1,864,992
SPEED CHANGING GEAR
Filed Feb. 28, 1929 5 Sheets-Sheet 2
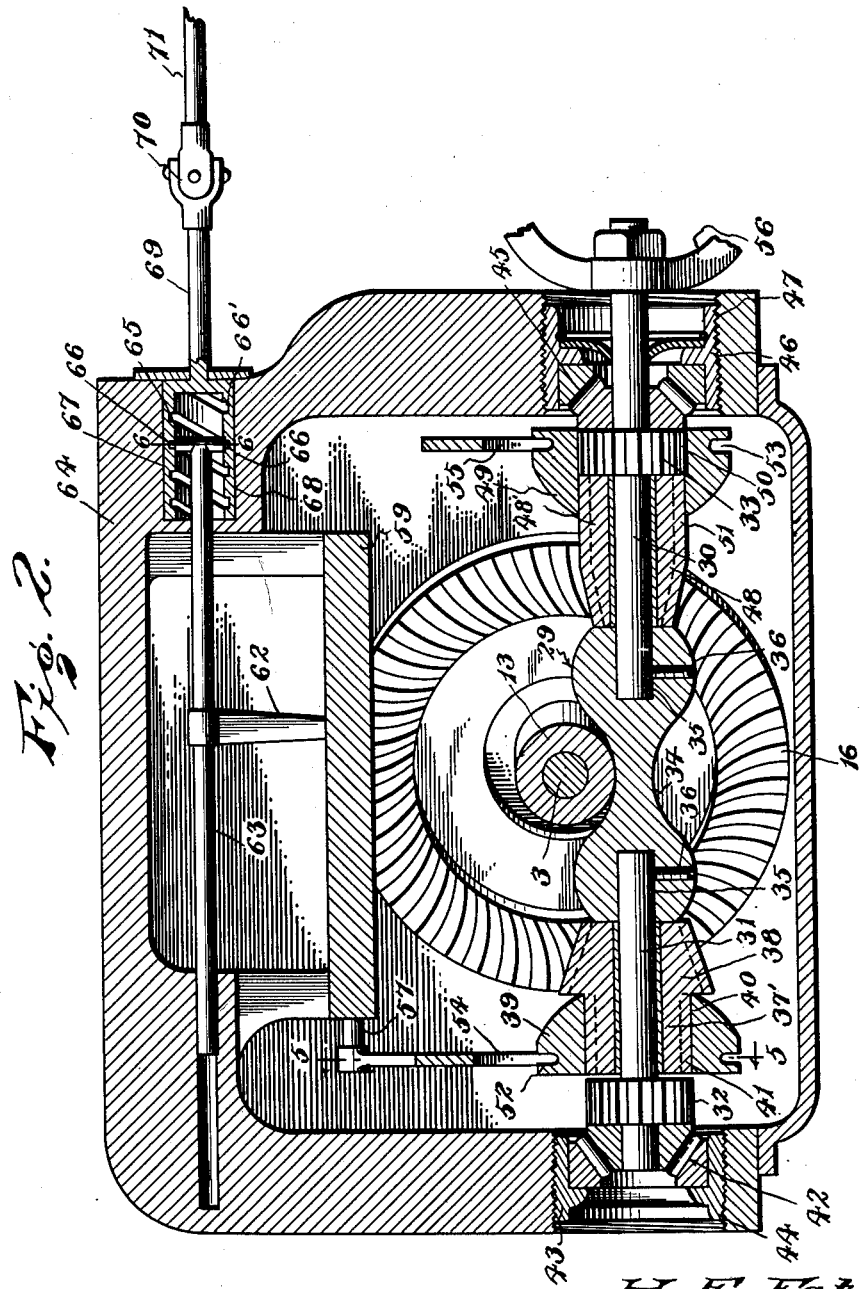
Inventor
H. E. Fatland
By Lacey & Lacey, Attorneys June 28, 1932.   H. E. FATLAND   1,864,992
SPEED CHANGING GEAR
Filed Feb. 28, 1929    5 Sheets-Sheet 3
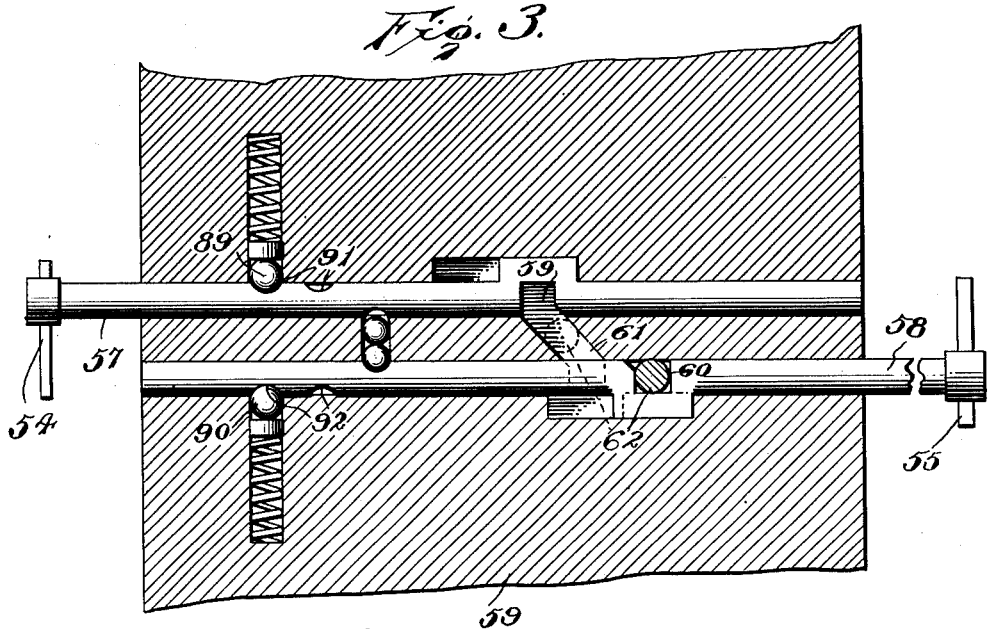
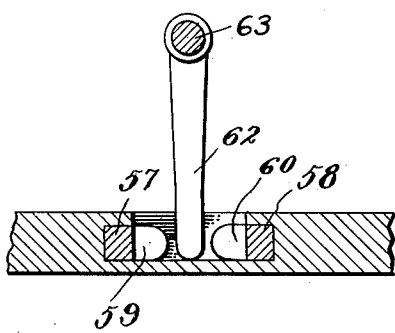
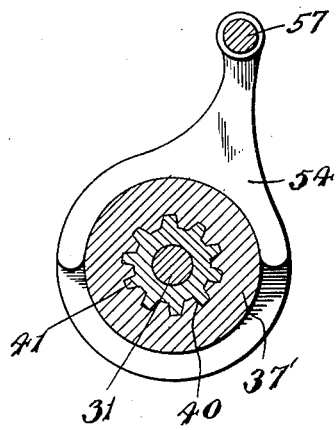
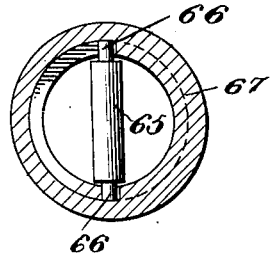
Inventor
H. E. Fatland
By Lacey & Lacey, Attorneys June 28, 1932.  H. E. FATLAND  1,864,992
SPEED CHANGING GEAR
Filed Feb. 28, 1929   5 Sheets-Sheet 4

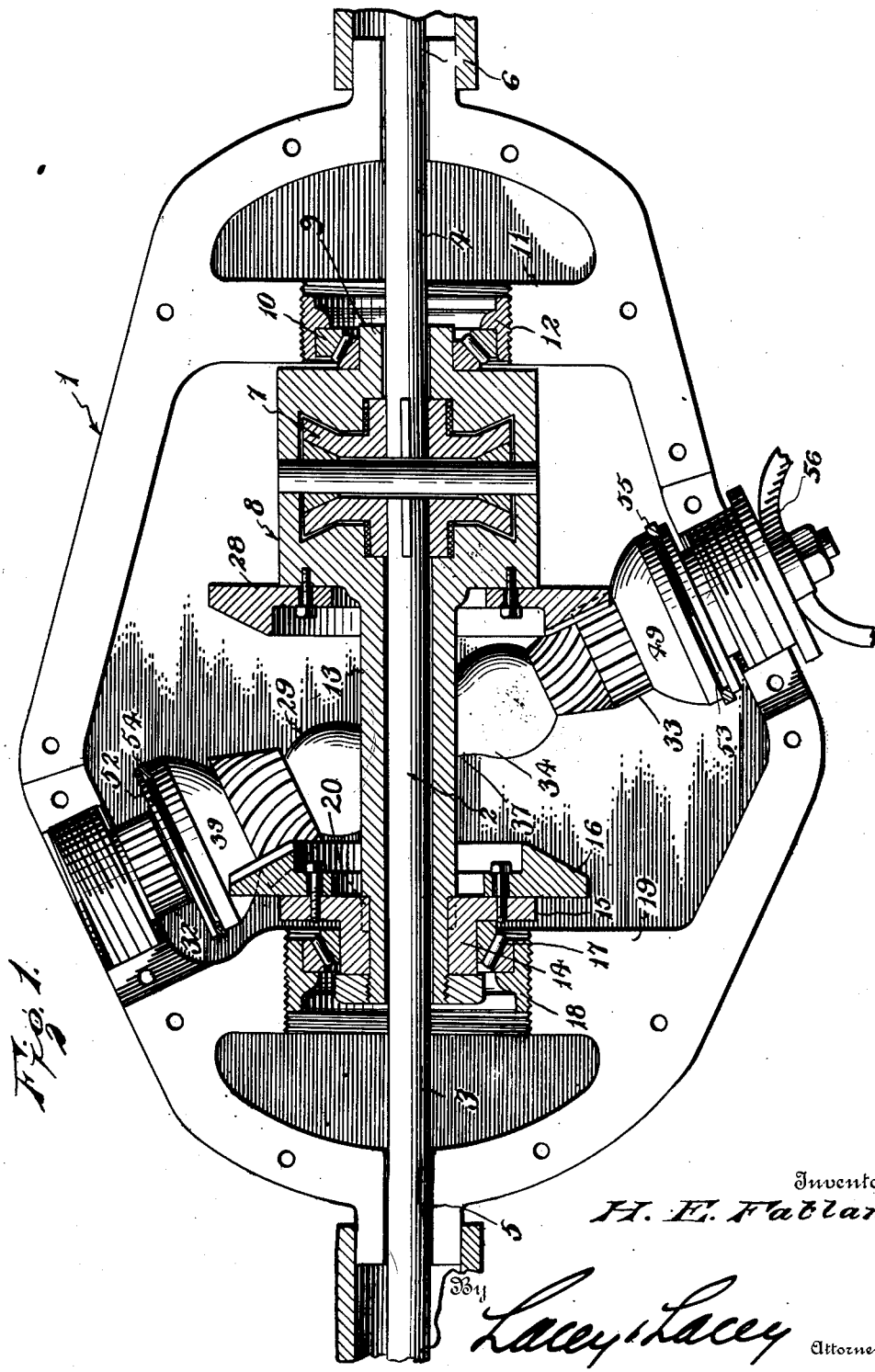

Inventor
H. E. Fatland
By Lacey & Lacey
Attorneys

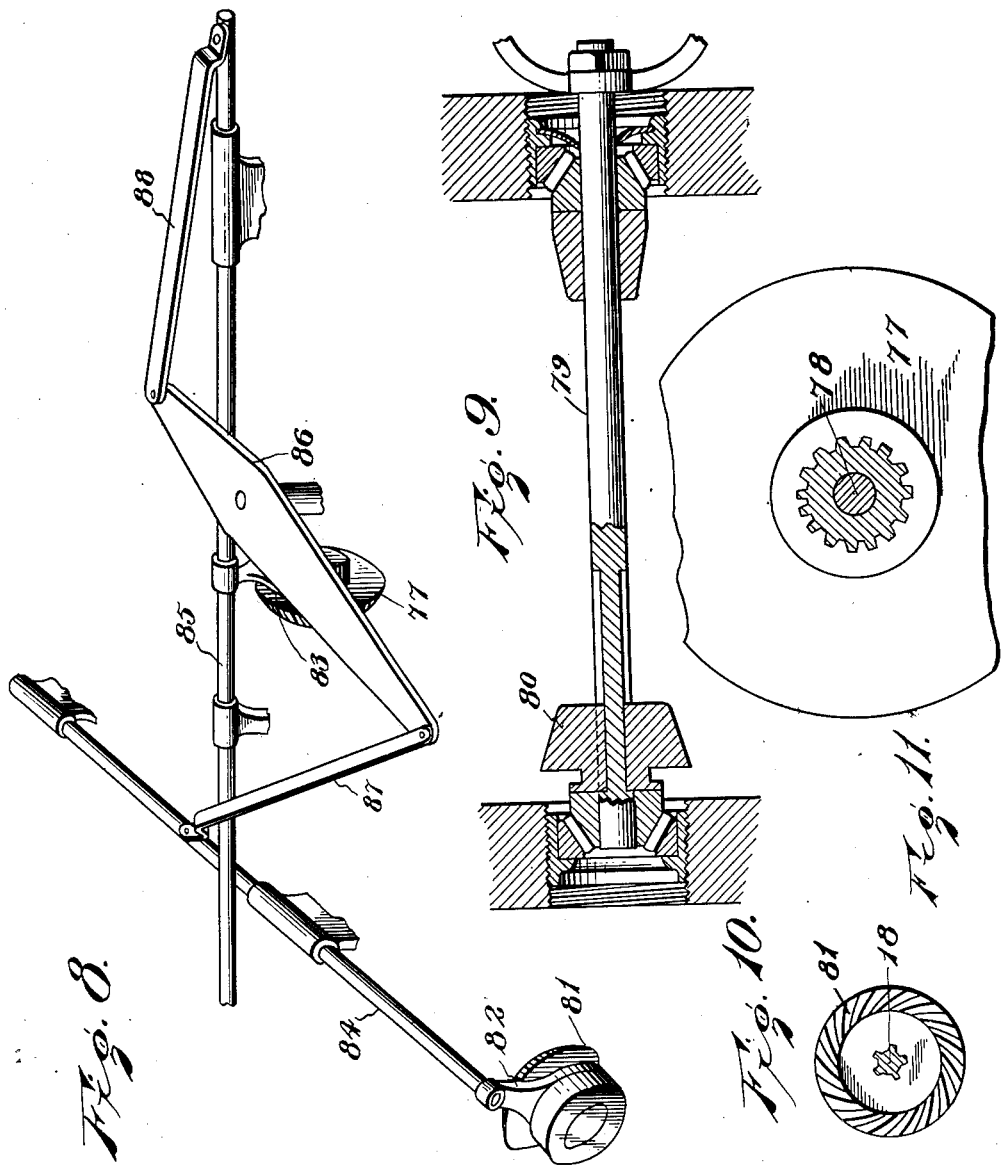

Patented June 28, 1932

1,864,992

UNITED STATES PATENT OFFICE

HAROLD E. FATLAND, OF CHICAGO, ILLINOIS

SPEED CHANGING GEAR

Application filed February 28, 1929. Serial No. 343,360.

The present invention is directed to improvements in speed changing gears and is more particularly designed for application to the rear driving axle of a motor vehicle in order that an additional speed change will be provided.

Another object of the invention is to provide a device of this kind so constructed as to permit two different gear reductions between the engine shaft and wheels without the necessity of using intermediate gears.

Another object of the invention is to provide a device of this kind wherein the axle and driving shaft will be arranged in angular relation, either at right angles or obliquely to each other.

Another object of the invention is to provide a device of this character which is simple in construction, durable, efficient in operation, and one which can be manufactured at a small cost.

With these and other objects in view, the invention resides in the novel features of construction, formation, combination and arrangement of parts to be hereinafter more fully described, claimed, and illustrated in the accompanying drawings, in which:

Figure 1 is a plan view, partly in section, showing the arrangement of the gearing within the differential housing.

Figure 2 is a longitudinal sectional view through the device.

Figure 3 is a view, somewhat diagrammatic, illustrating the means for shifting the gears.

Figure 4 is a detail sectional view through the shifting rod mechanism.

Figure 5 is a sectional view on line 5—5 of Figure 2.

Figure 6 is a sectional view on line 6—6 of Figure 2.

Figure 8 is a perspective view of the shifting mechanism used in connection with the modified form.

Figure 9 is a detail view of the driving shaft used in connection with the modified form.

Figure 10 is a sectional view on line 10—10 of Figure 7.

Figure 11 is a sectional view on line 11—11 of Figure 7.

Figure 7:
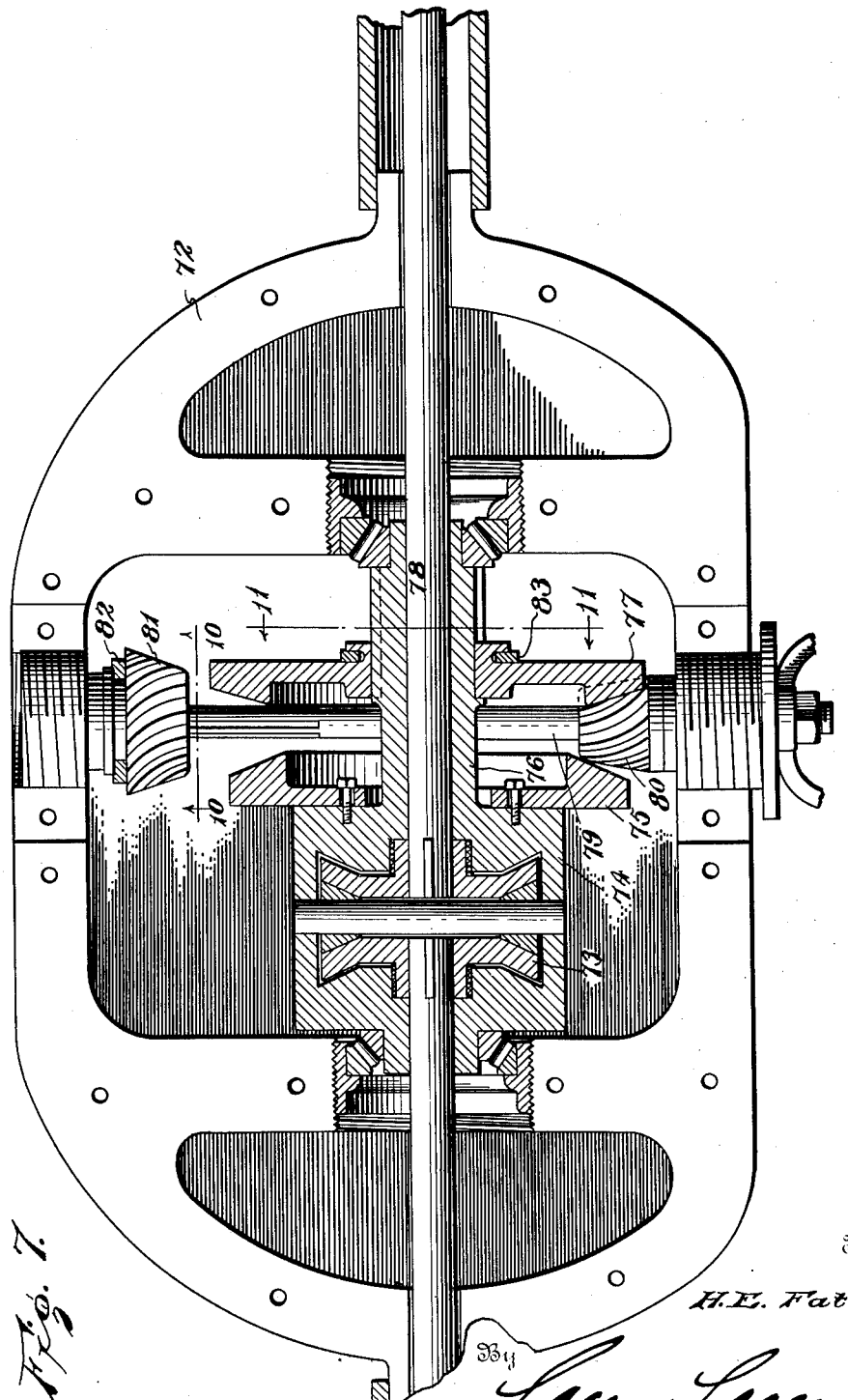
Figure 7 is a view, similar to Figure 1, of a slightly modified form of the invention.

Referring to the drawings, and more particularly to Figures 1 to 6 inclusive, the numeral 1 designates generally a part of the differential housing of a motor vehicle, and the numeral 2 the rear driving axle, the sections 3 and 4 thereof being engaged in recesses 5 and 6. These sections, as is customary, are connected to the differential mechanism 7. The differential housing may be of sectionalized formation to permit of convenient assemblage. The differential mechanism 7 is confined in the casing 8, one end of which is provided with a trunnion 9 rotatable in the roller bearing assembly 10 carried by the cross member 11 of the housing 1, said bearing being adjustable by the threaded sleeve 12. The axle section 4 is engaged in this trunnion.

The other end of the casing 8 is provided with a tubular extension 13, the outer end of which has fixed thereto a collar 14 having an annular flange 15 carried thereby and to the inner face of which is bolted the beveled gear 16. The collar 14 is journaled in the roller bearing assembly 17, said assembly, like the assembly 10, being adjustable to take up wear through the medium of the threaded sleeve 18, said sleeve being threaded in the cross member 19. The axle section 3 is extended through the extension 13, which is keyed, as at 20, to the collar 14.

A beveled gear 28 is bolted to the casing 8 and is greater in diameter than the gear 16 in order that a change of speed can be effected.

In order to selectively drive the gears 16 and 28, I provide a driving unit 29 which consists of a shaft 30 and a shaft 31, said shafts being provided intermediate their ends with circular toothed enlargements 32 and 33, respectively, the purpose of which will later appear. The ends of the shafts are spaced and are secured together by a connecter 34 having its ends provided with sockets 35 for receiving the shaft ends, there being set screws 36 for maintaining the shaft ends in said sockets. The driving unit 29 is, in this instance, disposed obliquely with respect to the axle 2 and the connecter is formed with a central annular groove 37 to accommodate the extension 13 in order that the device can be assembled compactly.

Loosely journaled upon the shaft 31 is the hub 37' of the hypoid gear 38 which meshes with the gear 16, said hub having a locking collar 39 slidable thereon and provided with grooves 40 for slidably interlocking with the ribs 41 of the hub. The outer end of the shaft 31 is journaled in a roller bearing assembly 42 mounted in the threaded sleeve 43 which is engaged in the bearing 44. The shaft 30 has its outer end journaled in a roller bearing assembly 45 mounted in the threaded sleeve 46, said sleeve being adjustable in the bearing 47.

Loosely mounted on the shaft 30 is a gear 48 adapted to mesh with the gear 28, the hub 48' having slidable thereon a locking collar 49 having grooves 50 formed therein for interlocking engagement with the ribs 51 carried by said hub. The collars 39 and 49 are provided with annular grooves 52 and 53 for engagement by the shifting forks 54 and 55, respectively. The shaft 30 has connected to its outer end the universal joint 56 which connects said shaft with the motor shaft of the vehicle engine in order that rotary movement may be transmitted to the driving unit 29.

In order to shift the collars 39 and 49 to cause either of the gears 38 and 48 to drive the beveled gears, I provide a pair of slide rods 57 and 58 mounted in the block 59 carried by the housing 1, and disposed above the driving unit 29.

The rod 57 has its outer end connected to the fork 54 and the fork 55 is connected to the outer end of the rod 58. These rods are provided with seats 59 and 60 which are in registration with the inclined groove 61 when the gear is in neutral. The lower end of the shift arm 62 is engageable in said groove. This arm is pivotally mounted upon the shaft 63 slidable in the head 64 of the housing 1. The shift arm is secured against sliding movement upon the shaft 63 in any approved manner, but is permitted to pivot thereon. One end of the shaft 63 has a cross head 65 provided with terminal trunnions 66 adapted to engage the spiral groove 66' formed in the sleeve 67, said sleeve being rotatably mounted in the socket 68. The sleeve 67 is provided with a rod 69 adapted to be rotated to impart rotary movement to said sleeve to move the shaft 63 longitudinally. This rod is connected by a universal joint 70 to an actuating rod 71, which may be manually rotated in any approved manner by the driver.

As shown in Figure 3, the arm 62 is engaged in the seat 60 so that the collar 49 interlocks with the hub 48' owing to the presence of the teeth of the enlargement 33 and ribs 51. When it is desired to change for an additional speed, the sleeve 67 is rotated, whereupon the arm 62 will slide the rod 58 to the left in order that said arm will pass through the groove 61 and enter the seat 60. During this movement, the collar 49 will slide from engagement with the enlargement 33 and upon the hub 48', thus permitting the gear 48 to freely rotate. Continued rotation of the sleeve 67 will cause the arm to disengage the seat 60 and pass through the groove 61 and enter the seat 59 of the rod 57. The rod 57 is then shifted to the left so that the fork 54 will slide the collar 39 to interlock with the enlargement 32 so that the gear 38 will drive the gear 16. In this manner, the gears 16 and 28 may be selectively driven.

In Figures 7 to 11 of the drawings inclusive, a slightly modified form of the invention is disclosed, wherein the differential housing is designated by the numeral 72 and in which is supported the differential mechanism 73 which is confined in a casing 74 to one end of which is fixed a beveled gear 75. The casing 74 has a tubular extension 76 upon which is splined a beveled gear 77. The axle section 78 is engaged in this extension. A driving shaft 79 is disposed at right angles to the extension 76 and has carried thereby a gear 80 adapted to mesh with the gear 77, said shaft being driven by the engine shaft, as in the other form of the invention. Slidably seated upon the shaft 78 is a gear 81 adapted to be moved into or out of mesh with the gear 75.

The gear 81 has associated therewith a fork 82, while associated with the gear 77 is a fork 83. The fork 82 is fixed to a slidable mounted rod 84 while the fork 83 is supported by a slidably mounted rod 85. The rods 84 and 85 are disposed at right angles to each other and have associated therewith a controlling bar 86 which can be swung in any suitable manner. It will be obvious that upon the swinging of this bar that sliding movement will be imparted to the rods 84 and 85. The bar 86 has one end pivotally connected to the rod 84 by a link 87 and its other end similarly connected to the rod 85 by a link 88. As shown in Figure 7, the gear 77 is in mesh with the gear 80, and when it is desired to change the speed, the bar 86 is rocked in a direction to shift the rod 85 so that the fork 83 will slide the gear 77 from mesh with the gear 80. As the gear 77 moves out of mesh the rod 84 will be slid in a direction to move the gear 81 into mesh with the gear 75. Thus it will be seen that the gears can be selectively changed in a simple and practical manner.

Spring pressed balls 89 and 90 cooperate with the recesses 91—91 and 92—92 of the respective rods 57 and 58 to hold the same in neutral position.

From the foregoing, it is thought that the construction, operation, and many advantages of the herein described invention will be apparent to those skilled in the art, without further description, and it will be understood that various changes in the size, shape, and proportions and minor details of construction may be resorted to without departing from the spirit or sacrificing any of the advantages of the invention.

Ball thrust bearings may, of course, be placed between the forks 82 and 83 and the associated gears 81 and 77, and suitable means may be provided for holding the rods 84 and 85 in their shifted position to positively hold the gear 77 in mesh with the gear 80 or the gear 81 in mesh with the gear 75.

Having thus described the invention, what is claimed is:

1. The combination with a differential driving mechanism, of axle sections driven thereby, a driving unit consisting of a pair of shafts disposed in angular relation to the axle sections, a connecter securing the ends of the shafts and having a groove to receive the axle sections, a gear rotatable on each shaft, a pair of gears connected with the differential mechanism for driving the axle sections, and means for selectively interlocking the gears of the unit thereto for selectively driving the differential driving gears.

2. The combination with a differential driving mechanism, of axle sections driven thereby, a pair of gears connected with the differential mechanism, a driving unit including a pair of alined shafts, a connecter between the shafts, said shafts having enlargements thereon, a gear rotatably mounted on each shaft, a collar slidably associated with each of said gears and interlocked therewith, and means for sliding the collars for selectively interlocking the collar with the enlargements to cause the gears of the units to selectively drive the first named gears.

3. In changeable speed gearing for motor vehicles including the usual differential gearing and a casing therefor having an extension, drive gears of different diameters connected with said casing to rotate therewith and concentric with the casing extension, a drive shaft crossing the casing extension and disposed obliquely between the drive gears, drive pinions loose on the drive shaft and in mesh with the respective drive gears at opposite sides of the casing extension, clutch members fixed to the drive shaft, movable clutch members, and means for adjusting the movable clutch members to clutchingly engage one or the other of the drive pinions with the drive shaft.

In testimony whereof I affix my signature.

HAROLD E. FATLAND.